Dec. 30, 1969    E. W. YETTER ET AL    3,487,226
METHOD AND APPARATUS FOR DETERMINING THE COORDINATE OF A
PROJECTILE BY MEASURING THE TIME INTERVAL BETWEEN THE
INTERCEPTION OF SUCCESSIVE LIGHT SCREENS
Filed Oct. 10, 1967    5 Sheets-Sheet 1

Inventors:
Harry G. Conner,
Edward W. Yetter.

Attorneys.

Inventors:
Harry G. Conner,
Edward W. Yetter.

TO PRINTER

Attorneys

Inventor:
Harry G. Conner,
Edward W. Yetter.

*John H. Lewis Jr.*
*John W. Phipps*
*Nicholas Skovran*
Attorneys.

Dec. 30, 1969    E. W. YETTER ET AL    3,487,226
METHOD AND APPARATUS FOR DETERMINING THE COORDINATE OF A
PROJECTILE BY MEASURING THE TIME INTERVAL BETWEEN THE
INTERCEPTION OF SUCCESSIVE LIGHT SCREENS
Filed Oct. 10, 1967    5 Sheets-Sheet 4

Inventors:
Harry G. Conner,
Edward W. Yetter.

Attorneys

Inventors:
Harry G. Conner,
Edward W. Yetter.

Attorneys

United States Patent Office 3,487,226
Patented Dec. 30, 1969

3,487,226
METHOD AND APPARATUS FOR DETERMINING THE COORDINATE OF A PROJECTILE BY MEASURING THE TIME INTERVAL BETWEEN THE INTERCEPTION OF SUCCESSIVE LIGHT SCREENS
Edward W. Yetter, West Chester, and Harry G. Conner, Kennett Square, Pa., assignors to Remington Arms Company, Inc., Bridgeport, Conn., a corporation of Delaware
Filed Oct. 10, 1967, Ser. No. 674,152
Int. Cl. H01j 39/12; G06m 7/00
U.S. Cl. 250—222                                14 Claims

ABSTRACT OF THE DISCLOSURE

A method and electro-optical apparatus for deriving time signals from the passage of a bullet through a series of intersecting optical planes, such time signals being utilized to provide information on bullet velocity and on the azimuth and/or altitude of the bullet trajectory.

---

This invention relates to a method and to electro-optical apparatus for deriving electrical signals from which the velocity and accuracy of ballistic projectiles may be determined, and has particular reference to use in determining the characteristics of single projectile small arms ammunition intended for use in rifles, shotguns and pistols.

In the traditional methods of ballistics control, accuracy has been determined by firing five or ten shot groups at paper targets and examining the target holes in relation to each other and to the center of impact. As the accuracy of ammunition improved, the group of target holes frequently came so close together as to produce only a single ragged hole in the target and an accurate measurement of group size, or even an accurate count of the number of shots in the target, became virtually impossible.

By the development of suitable electro-optical means it has become possible to determine quite accurately the time of passage of a projectile through a given target plane and, by suitable arrangement of several planes, to utilize these time signals as a means of determining the position of the projectile as it passes through the target planes.

Such an electro-optical device is particularly useful in application to test firing of ammunition for quality control purposes, and for test firing with ammunition of known quality to determine the accuracy of rifle barrels of unknown quality. Use of this device will reduce the labor requirements compared to the present manual method of test firing into paper targets with accompanying manual measurement and calculation, as well as increase the precision of accuracy determinations and minimize the time lag between ammunition manufacture and ammunition quality determination. Such a device also permits attainment of an important safety objective in that it is no longer necessary to expose personnel to the hazard of going down range to pick up and change targets, where accidents have happened in spite of precautions of closing and locking shooting ports, etc., while personnel are exposed.

The exact nature of the invention as well as other objects and advantages thereof will become more apparent from consideration of the following specification, referring to the attached drawings, in which.

Figure 1:
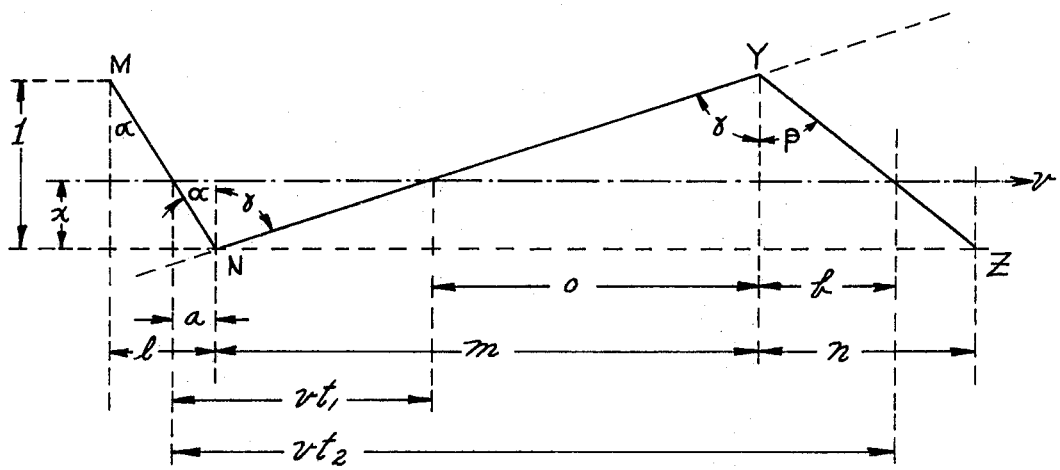
FIG. 1 is a two-dimensional diagram illustrating the relative location of three planes, each defined by the linearly extended dimensions of collimated beams of radiation which may be utilized in a simplified embodiment of the invention.

Referring particularly to FIG. 1, there is shown diagrammatically a two dimensional arrangement including three collimated beams of radiation, MN, NY and YZ. Two of these beams, for example, MN and NY, should intersect, and these intersecting beams as well as the third beam should all intersect the path of a projectile, shown in the diagram as a dot-dash line. Each of these beams is equipped with a device, to be later described, which permits an exact determination of the time at which the projectile passes through the particular beam and these time sensing devices are connected, also by means to be later described, with equipment which permits an exact determination of the time elapsing between the successive penetrations of the three beams by the projectile. In FIG. 1, the path lengths traversed by the projectile during these time intervals ($t_1$ and $t_2$) are designated "$vt_1$" and "$vt_2$," since it may be reasonably assumed that during the short time intervals involved the velocity ($v$) of the projectile is substantially constant. These time intervals can be utilized to determine the $x$ coordinate of the path of the bullet in terms of the physical dimensions of the beam ararngement in accordance with the following derivation:

(1) $\dfrac{a}{x} = \tan \alpha;$        $a = x \tan \alpha$ $\dfrac{l}{1} = \tan \alpha;$        $l = \tan \alpha$ $\dfrac{m}{l} = \tan \gamma;$        $m = \tan \gamma$ $\dfrac{b}{1-x} = \tan \beta;$        $b = (1-x) \tan \beta$ $\dfrac{n}{1} = \tan \beta;$        $n = \tan \beta$ $\dfrac{o}{1-x} = \tan \gamma;$        $o = (1-x) \tan \gamma$ These values for the physical dimensions of the system may be substituted in equations for "$vt_1$" and "$vt_2$" as follows in Equations 2 and 3, and solved for the value of $x$ as in Equations 4, 5, 6 and 7:

(2) $vt_1 = a + m - o$
$= x \tan \alpha + \tan \gamma - (1-x) \tan \gamma$
$= x(\tan \alpha + \tan \gamma)$ (3) $vt_2 = a + m + b$
$= x \tan \alpha + \tan \gamma + (1-x) \tan \beta$
$= x(\tan \alpha - \tan \beta) + \tan \gamma + \tan \beta$ (4) $\dfrac{vt_1}{vt_2} = \dfrac{x(\tan \alpha + \tan \gamma)}{x(\tan \alpha - \tan \beta) + \tan \gamma + \tan \beta}$ (5) $t_2 x(\tan \alpha - \tan \beta) + t_1(\tan \gamma + \tan \beta) -$
$t_2 x(\tan \alpha + \tan \gamma) = o$ (6) $x[t_1(\tan \alpha - \tan \beta) - t_2(\tan \alpha + \tan \gamma)] =$
$-t_1(\tan \gamma + \tan \beta)$ (7) $x = \dfrac{t_1(\tan \gamma + \tan \beta)}{t_1(\tan \alpha + \tan \gamma) - t_1(\tan \alpha - \tan \beta)}$ The foregoing derivation is illustrative of the geometric principles involved in the invention. It will be obvious to those skilled in the art that various other configurations involving three collimated beams of radiation in fixed relationship to each other, and intersecting the path of the projectile, may be used to locate a coordinate of the projectile path with reference to an intersection of two of the beams, or the linear extensions thereof. For example, in FIG. 1, point Y could be used as the origin of the desired coordinate, or beam YZ could be located to the left of beam MN, while retaining point N as the origin.

Figure 2:
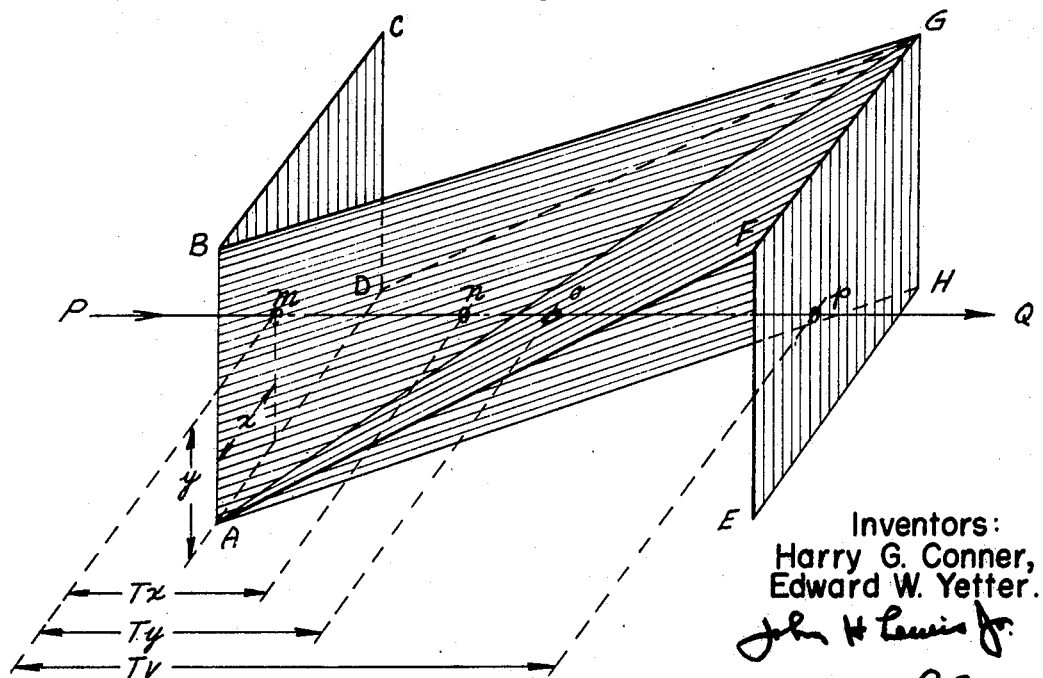
FIG. 2 is a three-dimensional diagram illustrating in perspective the relative location of four planes, each defined by the linearly extended dimensions of collimated beams of radiation utilized in a preferred embodiment of the device.

Referring to FIG. 2, it can be seen that the preferred embodiment of the device includes four planes, each consisting of a thin sheet or band of collimated radiation such as will result from the passage of a beam of collimated light through a long, narrow slit. At the opposite end of that surface, the beam passes through a similar receiving slit behind which there is located a light detector capable of detecting a momentary partial or total interruption of the light.

The four planes are arranged as shown in FIG. 2. Planes A, B, C, D and E, F, G, H are arranged in parallel relationship to each other and are substantially normal to the path a projectile will follow in passing through them. An oblique plane A, D, G, F connects the bottom horizontal side A, D of plane A, B, C, D with the top horizontal side F, G of plane E, F, G, H. Similarly, an oblique plane A, B, G, H connects the near vertical side A, B of plane A, B, C, D with the far vertical side G, H of plane E, F, G, H.

The path of a bullet or other projectile is shown as line P, Q in the direction of a bullet passing through the optical unit and intersecting the four optical planes at points $m$, $n$, $o$ and $p$. Considering the plane A, B, C, D as the reference plane in which projectile distribution is to be determined, the coordinates of the point of intersection $m$ may be designated as $x$ and $y$ in a system having its origin at the corner A, the point of intersection of planes A, B, C, D, A, B, G, H, and A, D, G, F. For convenience, it will be assumed that the planes A, B, C, D and E, F, G, H are squares with sides of unit length. It is also assumed that the bullet path is a straight line normal to both vertical planes and that the velocity of the bullet remains constant while it traverses the distance between point $m$ in plane A, B, C, D and point $p$ in plane E, F, G, H.

As a projectile passes through each optical plane in turn it causes a momentary partial interruption in the light which is passed through to the light detector. As will be hereinafter described in more detail, this interruption of the light beam may be utilized to produce an electrical signal impulse capable of triggering the Start and Stop circuits of a time measuring device such as a chronograph which counts cycles of a high frequency precision oscillator throughout the pertinent time interval. Three such chronographs may be used, all being started simultaneously by the signal impulse derived from plane A, B, C, D and each being stopped in turn by signal impulses derived from oblique plane A, B, G, H, oblique plane A, D, G, F, and vertical plane E, F, G, H. The chronographs will measure the time intervals $Tx$, $Ty$ and $Tv$ corresponding to the times of flight from point $m$ to points $n$, $o$, and $p$, respectively.

In a simplified derivation, taking into account the unit light of each of the significant dimensions of the system, the $x$ and $y$ coordinates of the path of the bullet may be determined as functions of ratios of the time intervals as set forth below.

$$X = Tx/Tv \qquad Y = Ty/Tv$$

Considering separately the horizontal and vertical projections of the various optical planes, it can be seen that a vertical projection onto a horizontal plane A, D, H, E establishes a pair of similar triangles in which the ratio $Tx/Tv$ referred to the unit length of the horizontal side A, D of plane A, B, C, D is the $x$ coordinate of the point $m$. Similarly, a horizontal projection onto a vertical plane A, B, F, E establishes a pair of similar triangles in which the ratio $Ty/Tv$, referred to the unit length of the vertical side A, B of the plane A, B, C, D is the $y$ coordinate of the point $m$. If the sides of the vertical optical plane (i.e., A, B and A, D and E, F and E, H) are of other than unit length, the actual dimensions of the optical plane must be applied to the ratios of time to determine the coordinates of the point $m$.

In addition, the actual bullet velocity may be computed from the time interval $Tv$ by the relationship Velocity = $L/Tv$ where L equals the horizontal distance between the two vertical optical planes.

In the practical application of this equipment, the three time intervals measured are contained in the three chronograph counters from which they may be extracted for further use as follows. A particularly useful combination of equipment for practical ballistic use is shown in block diagram form in FIG. 4. Here the chronograph outputs are connected to a small digital computer, which may be programmed to automatically compute results such as the mean radius of a number of shots from center of impact, maximum deviation from center of impact, etc., as well as a correlation of each individual location with the velocity of the corresponding bullet.

The computations required for the examples given are as follows:

(A) Determination of center of impact.—The center of impact, or group center, may be defined as the point whose $x$ coordinate is the arithmetic mean of the $x$ coordinates of all individual shots, and whose $y$ coordinate is the arithmetic mean of the $y$ coordinates of all shots.

This is accomplished by summing the coordinates, and dividing by the number of shots (1)
$$X = \frac{1}{n} \cdot \Sigma x_i$$
$$Y = \frac{1}{n} \cdot \Sigma y_i$$

where $X$, $Y$ = coordinates of center of impact of the group $x_i$, $Y_i$ = coordinates of individual shots $n$ = number of shots (B) Transfer of coordinates to center of impact Transformation of the original coordinates with the center of impact as the new origin is accomplished by subtracting the coordinate of the center of impact from the coordinate of each shot.

(2)
$$x_i^* = x_i - X$$
$$y_i^* = y_i - Y$$

where $x_i^*$, $y_i^*$ are the new coordinates of each shot, referenced to the center of impact.

(C) Calculation of distance of each shot from center of impact.—This is performed by taking the square root of the sum of the squares of the new coordinates for each shot.

(3)
$$r_i = \sqrt{x_i^{*2} + y_i^{*2}}$$

$r_i$=distance (radius) of each shot from center of impact (D) One pertinent result, for ammunition evaluation, is the mean radius of the group.

(4)
$$R = \frac{1}{n} \cdot \Sigma r_i$$

R=mean radius additional computations, such as maximum radius, extreme spread, standard deviation, etc. may be computed by well-known mathematical algorithms. To correlate the position of any individual shot with the bullet velocity at the target point, the velocity may be calculated directly from the known time of flight of the bullet between the between the entrance and exit planes.

(5)
$$V_i = L/T_v$$

Figure 4:
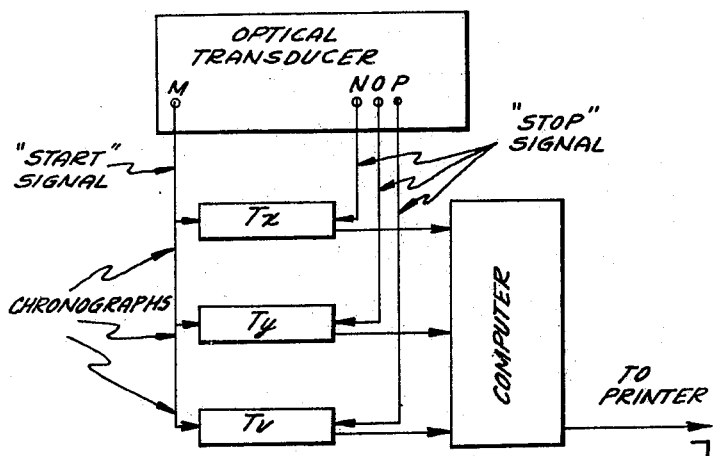
FIG. 4 is a block diagram outlining electrical circuitry suitable for use with the preferred embodiment.

$V_i$=velocity of bullet
L=horizontal separation of vertical planes
$T_v$=travel time between vertical planes As indicated by the block diagram, FIG. 4, the computer can be readily programmed to handle all or any part of these calculations and can store the information in the computer memory circuits, print it out on suitable equipment or produce a graphical display on a cathode ray tube screen which may be reproduced photographically to provide a permanent target replica of an individual shot or group of shots.

Figure 3:
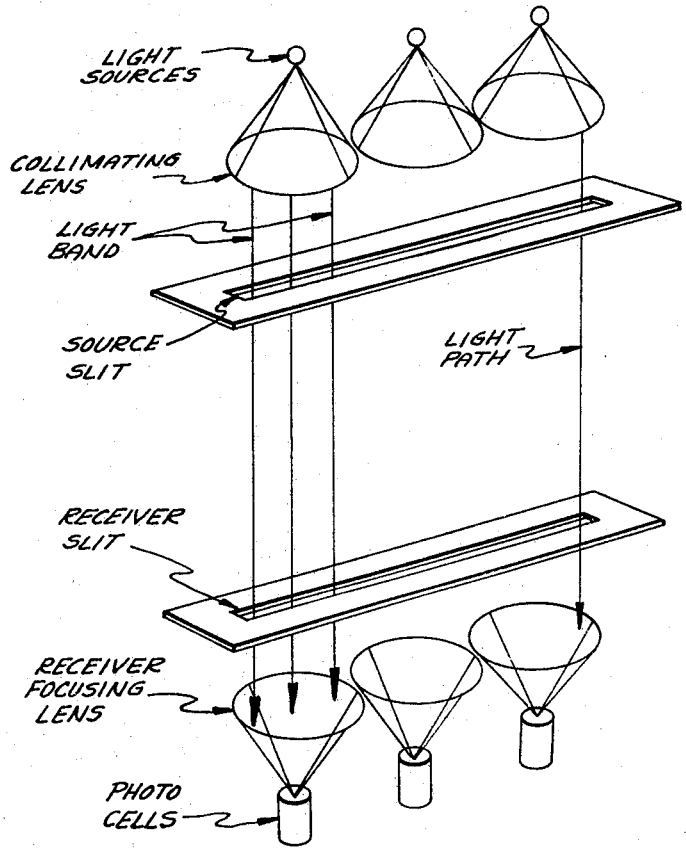
FIG. 3 is a perspective diagram illustrating a general arrangement of an optical system arranged to produce collimated beams of light suitable for defining planes such as those illustrated in FIGS. 1 and 2.

The details of the formation of an optical plane are shown in FIG. 3, together with the means for detection of the penetration of the plane by the bullet.

A source slit, which defines the length and thickness of the optical plane, is illuminated by parallel light from a multiplicity of light source-collimating lens combinations, each of which defines an individual light band. These light bands are parallel, coplanar, and located immediately adjacent each other, so the combination forms a substantially continuous light sheet.

This light then passes through a receiver slit, where the light in each individual band is focused onto a photosensitive detector, such as a Texas Instrument LS-400 solid-state photocell. The circuit associated with each photocell (known in the art) is arranged so it will provide a voltage impulse when the light incident on the photocell decreases.

During operation, the system is arranged so that all of the photocells are illuminated to a degree such that a relatively high current will flow through the photocell, yet not so high that the cell is saturated. At the instant of passage of a bullet through any given one of the optical planes, if the path is such that the bullet is completely within the confines of one light band, the light incident on the corresponding photocell will decrease by an amount in proportion to the ratio of the bullet diameter to the width of the band. In the worst case condition, which occurs when the bullet path intercepts the boundary between two light bands, the light on the photocell associated with each band will decrease by an amount in proportion to the ratio of one-half the bullet diameter to the width of the band. Thus, in the preferred arrangement, where a light band 1" wide is focused on a photo-cell, the passage of a .22 caliber bullet through the light band will intercept 11% of the light which would be otherwise incident upon each of the two photocells. This is a sufficient decrease in the incident light to produce a well defined output pulse from the amplifier associated with each photocell.

A logical OR circuit has been defined as any device having two or more inputs and a single output in which the output is *on* whenever at least one input (or more than one input) is *on* and the output is *off* only when all of the inputs are *off*. Thus, the outputs of the individual photocell amplifiers may be combined in a logical OR circuit so that the output of the OR circuit is normally *off* when all of the photocells are illuminated at their normal level and will be *on* whenever the light input to any one or more of the photocells has been interrupted to a significant degree.

In the preferred arrangement described above, each of the light planes perpendicular to the line of flight of the projectile is 12" wide and is subdivided into 12 individual 1" light bands, each monitored by a single photocell. The outputs of the 12 photocells are combined in a logical OR circuit, as described above. Each of the two oblique light planes has an 18" span subdivided into 18 individual light bands of 1" width, each monitored by a single photocell. The outputs of the 18 photocells are combined in a logical OR circuit.

Thus, the passage of the projectile through each optical plane in turn will produce an output signal or voltage impulse from each of the logical OR circuits associated with a particular optical plane. Assuming that the smallest diameter projectile of interest intercepts a sufficiently high percentage of the light incident on a particular photocell, the voltage impulse at the output of the individual photocells and at the output of the logical OR circuit will be of sufficient magnitude to be easily discernible above the random electrical noise likely to be present in any circuit operated in an industrial environment.

The electric impulses described above are used to furnish the start and stop signals to three chronographs for the determination of time intervals, $T_x$, $T_y$, and $T_v$. Each chronograph is an electronic counter, with a source of accurately timed pulses, arranged so that the pulse source may be effectively connected to or disconnected from the coutner by an external signal. The chronographs are arranged to receive the start and stop signals as follows, referring to FIGURES 2 and 4.

(1) All three chronographs are started at the instant the bullet passes through plane ABCD, i.e., when the bullet reached point $m$.
(2) Chronograph $T_x$ is stopped when the bullet passes through plane ABGH, i.e., at point $n$.
(3) Chronograph $T_y$ is stopped when the bullet passes through plane ADGF, i.e., at point $o$.
(4) Chronograph $T_v$ is stopped when the bullet passes through plane EFGH, i.e., at point $p$.

The numerical values of the three time intervals, in units corresponding to the period of the pulse source, will then be contained in the three counters, from whence they may be extracted for further use as explained above.

Figure 5:
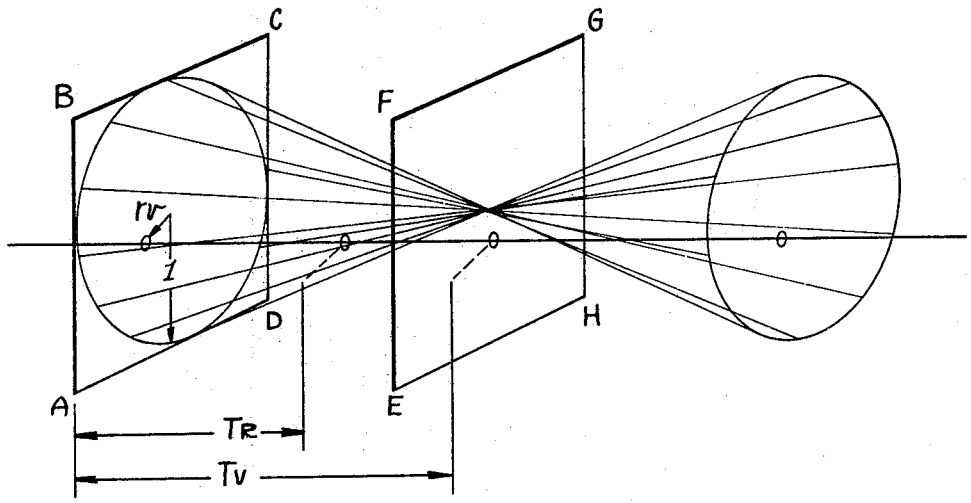
FIG. 5 is a diagram similar to FIG. 2 utilizing a reference surface of conical rather than planar configuration, also defined by the linearly extended dimensions of collimated beams of radiation.

The basic principles embodied in the optical transducer may be utilized in other configurations. For example, a circular coordinate embodiment is illustrated in FIG. 5, in which the distance of each shot from a predetrmined center point is detected. This is particularly useful in automatic scoring of rifle match shooting. In this case, two vertical planes, ABCD and EFGH, may be provided together with a conical light surface, with its axis parallel to the projectile path. Light sources and receivers for the vertical planes are identical with those shown in the rectilinear embodiment. The source for the conical light surface necessarily requires a circular slit, and the receiver for the conical sheet requires a circular slit which is located at the peripheral circle of the right side of the extended cone. Chronograph $T_v$ is arranged to be started and stopped at the time of intersection of the bullet path with planes ABCD and EFGH, respectively. Chronograph $T_r$ is started at the intersection of the bullet with plane ABCD, and stopped by the *first* intersection of the bullet path with the conical surface. Then, assuming unit radius of the circle of intersection of the cone with plane ABCD, $$1-r=\frac{T_r}{T_v}$$

$$r=1-\frac{T_r}{T_v}$$

Various other geometrical configurations of light surfaces may obviously be required for other specific applications. Also, a multiplicity of units may be connected to detect a number of points in the projectile path to determine, for example, the complete trajectory and remaining velocity of a single bullet, or the average trajectory of a selected number of shots.

Figure 6:
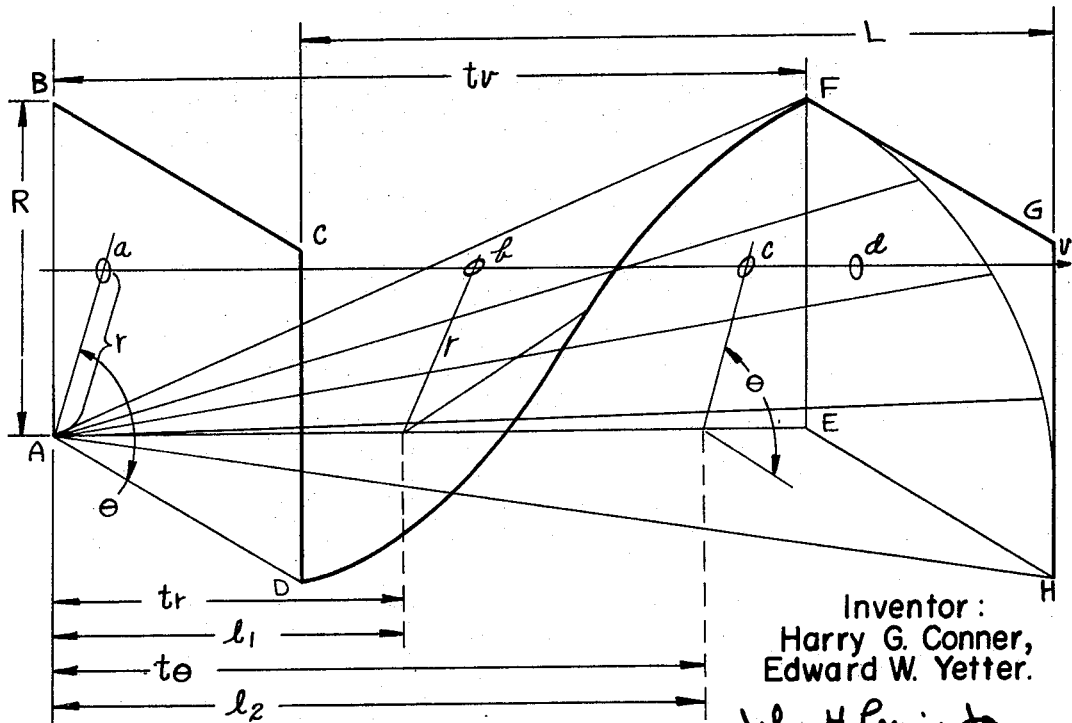
FIG. 6 is a diagram similar to FIGS. 2 and 5 utilizing reference surfaces of other configurations.

As an illustration of the versatility of the system with respect to geometrical configurations other than those described thus far, reference may be made to FIG. 6 and to the following description of the embodiment illustrated schematically in that figure.

The geometry of the light surfaces formed by a multiplicity of individual beams, is shown in FIG. 3. (Since details of formation of these beams have been adequately discussed in other embodiments, this is not repeated here.) The configuration consists of two planes ABCD and EFGH, containing right angles BAD and FEH, respectively; a quarter section of a right circular conical surface AEFH, and a quarter turn of a regular helical surface ADFE.

The planes are located normal to the bullet path, spaced apart a distance L. The portion of the cone is located with its vertex at A, and its center line coincident with line AE joining the right angle corners of the two planes. The helical surface is also located with its center of revolution on line AE, and arranged so that a line section of the beginning of the active portion is coincident with line AD and a line section at the termination of the active portion is coincident with line EF.

The path of the projectile is parallel to line AE, and intersects plane ABCD at point $a$, the surface of cone AEFH at point $b$, the surface of helical surface ADFE at point $c$, and plane EFGH at point $d$.

The radius $r$, i.e., the distance from point $b$ on the surface of the cone to line AE, is related as follows:

$$\frac{r}{R}=\frac{l_1}{L}$$

(1) $$\therefore r=\frac{R}{L}l_1$$

Since the helical surface is generated by a line element simultaneously and uniformly rotating and translating about a linear path in space, specifically line AE, the angle separating two line elements in the surface is proportional to the linear distance between the line elements. Thus, the angle $\theta$ between a perpendicular connecting point $c$ to line AE, and the base line AD, is related as follows:

$$\frac{\theta}{90°}=\frac{l_2}{L}$$

(2) $$\theta=l_2\frac{90°}{L}$$

The quantities $r$ and $\theta$ are shown projected on plane ABCD, where they locate, in circular coordinates, the position of point $a$ with reference to the locus point A defined by the intersection of collimated beams forming, respectively, plane ABCD, conical surface AEFH, and helical surface ADFE.

If it is assumed that the projectile velocity $v$ remains constant during its traverse of the distance L, then:

(3) $L=vt_v$ where $t_v$=time to traverse length L
(4) $l_2=vt_\theta$ where $t_\theta$=time to traverse length $l_2$
(5) $l_1=vt_r$ where $t_r$=time to traverse length $l_1$ Substituting (5) and (3) in (1):

$$r=\frac{R}{vt_v}vt_r$$

(6) $$\therefore r=R\frac{t_r}{t_v}$$

Substituting (4) and (3) in (2):

$$\theta=vt_\theta\frac{90°}{tv_v}$$

(7) $$\therefore \theta=90°\frac{t_\theta}{t_v}$$

Thus, the two locating coordinates have been defined in terms of time measurements.

Additional computations for center of impact, etc., may be carried out by conventional methods similar to those described in the rectilinear embodiment.

Figure 7:
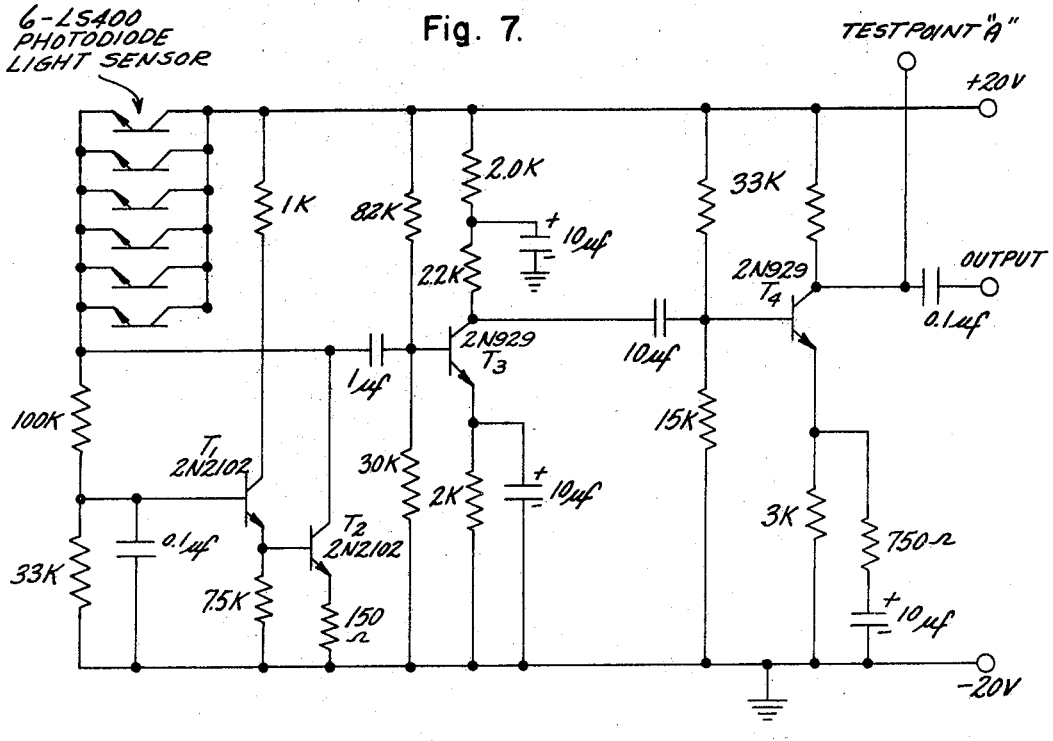
FIG. 7 is a schematic wiring diagram of one of a number of identical preamplifiers used to amplify the signals from the photosensitive cells used to detect the passage of a bullet as used in the preferred embodiment.
Figure 8:
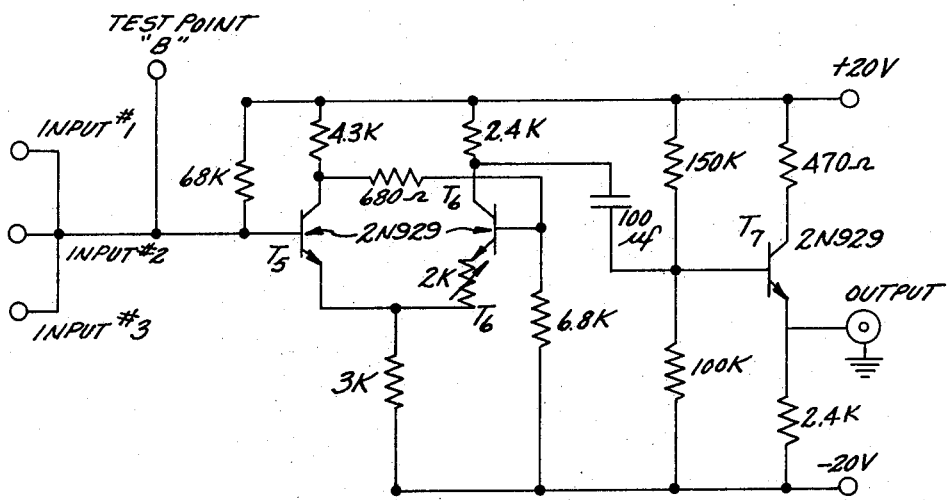
FIG. 8 is a schematic wiring diagram of one of a number of similar Schmitt trigger and emitter-follower circuits which receive the signals from the preamplifiers and transform them into pulses suitable for energizing the computer circuits as used in the preferred embodiment.

FIGS. 7 and 8 show schematically a preferred arrangement of the electronic components. FIG. 7 is one of a number of identical preamplifier units, each receiving the signals from six of the photocells or photosensitive solid state diodes previously referred to in the general description of the exemplary system illustrated in FIGS. 2, 3 and 4. In the exemplary system there are ten such units, each including six photosensitive diodes, which together monitored the four optical planes concerned in that embodiment. Two units of six photosensitive detectors are used for each of two vertical planes and three units of six photosensitive detectors are used for each of the two inclined planes.

Each preamplifier unit is described in more detail as follows:

The signals generated by the LS400 light-sensitive photodiodes are amplified by two silicon transistors, $T_3$ and $T_4$ on circuit diagram, Type 2N929. The circuit diagram shows test point A as the output of the pre-amplifier and Note #s 1 on the circuit diagram shows an idealized pulse for reference purposes which would be seen if an oscilloscope were connected to test point A. The width of the pulse, which would be observed on the oscilloscope, is a function of the bullet length and its velocity. The voltage amplitude will be approximately 2 volts peak or a 17% obscuration of the 1 in. span associated with each LS400 detector. The amplitude of this pulse at test point A is controlled at least partially by the automatic light level control provided by $T_1$ and $T_2$, Type 2N2102 silicon transistors. The automatic amplitude control adjusts the effective load resistance and hence the current through the LS400's, to compensate for differences in source illumination level. An unusually bright source on one of the six detectors will cause only a minor increase in the observed amplitude of a pulse at test point A. It will be understood, however, that the pulse amplitude will be affected by the diameter of the bullet, and its duration by the time in which the bullet remains in the light path; i.e., by the bullet length and velocity.

FIG. 8 is one of several identical Schmitt trigger and emitter-follower units which couple the photosensitive detector units to the computer circuitry to utilize the time signals derived from the photosensitive detectors. Four of the units as shown in FIG. 8 are required with the exemplary embodiments illustrated in FIGS. 2, 3 and 4; two of these units each being adapted to receive the output of two of the preamplifier units of FIG. 7 associated with each of the vertical optical planes and two other of these units each being adapted to receive the output of three of the preamplifier units of FIG. 7 associated with each of the oblique optical planes. To avoid duplication, FIG.

8 shows a unit arranged for three inputs but it will be understood that this unit can be used as well with only one or two inputs if needed to cover an optical plane of lesser area.

Each of the trigger and emitter-follower units is described in more detail as follows:

The Schmitt trigger circuit, comprising transistors $T_5$ and $T_6$, Type 2N929, serves to provide a reproducible pulse amplitude and duration from projectiles of different lengths, velocities and diameters. Each pre-amplifier circuit, fed by six photo-diodes comprising 6 in. of plane width, feeds into a single Schmitt trigger circuit for that particular optical plane. There are two pre-amplifier cards feeding a single Schmitt trigger and its emitter-follower system. On the oblique planes (18 in. in width) three pre-amplifier cards feed a single Schmitt trigger and its emitter-follower. Each pre-amplifier is fed to the Schmitt trigger through a 0.1 µf. capacitor. The input to the Schmitt trigger as shown in FIG. 7 must be above 1 v. peak to cause the Schmitt trigger to operate. Signal voltages lower than this will not cause Schmitt trigger operation, thus preventing false operation from random noise pulses, and the like.

The emitter-follower, $T_7$, Type 2N929, provides a low impedance output to allow transmission of the time signals to the chronograph counters located, preferably, at the computer which may be some distance from the target point. The output in FIGURE 8 is a negative-going pulse of approximately 2 microseconds duration, whose amplitude is above 1 volt peak into a 470 ohm load. At other load resistances the amplitude may be greater or less than the value indicated depending on the impedance level which the signal works into.

The light sources, a total of 60 in the exemplary embodiment of the accuracy screen, are GE type 253, 2½ volt, 350 milliamp, long life (10,000 hours) types. To increase the life, each unit is operated at 2 volts. The filtered and regulated power supply for the lamps operates with an output voltage of 24 volts DC and supplies 12 lamps in series. The oblique planes containing 18 lamps each are operated with 12 lamps in series, and the two remaining groups of six lamps each are connected in series to again provide 12 series connected units.

Figure 9:
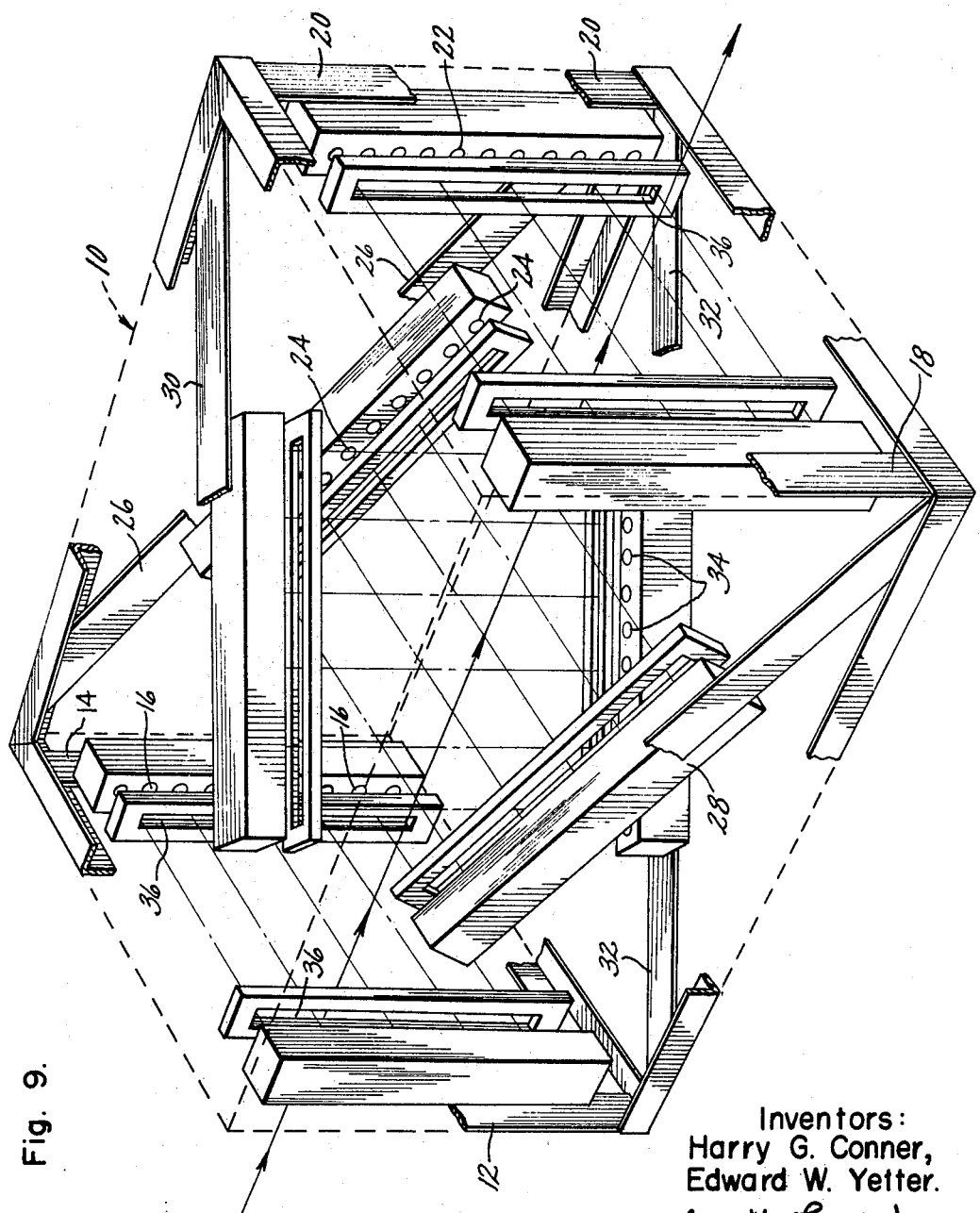
FIG. 9 is a perspective view, showing the mechanical arrangement of one exemplary embodiment of the invention.

FIG. 9 shows in perspective, parts of the frame being broken away for clarity, a working embodiment of the exemplary form of the invention disclosed in FIGS. 2, 3, and 4. To secure the utmost in rigidity, the frame 10 is massively constructed of heavy steel channel stock, and advantage is taken of the bullet resisting quality of such material to shield the optical and electronic components from a possible stray shot. Relating this figure to FIG. 2, it can be seen that the optical plane ABCD is provided in the forwardmost pair of vertical frame members 12 and 14 with a series of twelve sources of collimated light 16 mounted in the frame member 14 corresponding to CD, while a set of twelve photosensitive diodes (not shown) are mounted in the frame member 12 corresponding to AB to receive the light coming from the sources.

Similarly, the optical plane EFGH is provided in the rearwardmost pair of vertical frame members 18 and 20 with twelve light sources 22 mounted in the frame member 20 corresponding to GH and with twelve photosensitive diodes (not shown) mounted in the frame member 18 corresponding to EF.

The optical plane ADFG was for convenience in construction replaced by an optical plane BCEH consisting of eighteen light sources 24 and eighteen photosensitive diodes (not shown) mounted in the diagonal braces 26 and 28 corresponding to CH and BE, but it should be obvious that the change in the slope of the optical plane does not detract from its utility in providing a time signal for which the height of the bullet path can be derived.

The optical plane ABGH is similarly provided by mounting on the diagonal brace 30, corresponding to BG, a set of eighteen photosensitive diodes (not shown), and on the diagonal brace 32, corresponding to AH, a similar set of eighteen sources of collimated light 34.

An elongated slit 36 is provided in each of the frame members to assist in defining the sheets of light which form the optical planes and to minimize the exposure of optical and electronic components to accidental injury. Preferably the ten preamplifier circuit boards embodying the components indicated in FIG. 7 are mounted in close proximity to their related photosensitive diodes.

Close inspection of FIG. 9 will reveal that the two inclined optical planes ABGH and BCEH, defined by braces 30–32 and 26–28, respectively, do not actually intersect the optical planes ABCD and EFGH at the corners of the sensitive area of those optical planes as indicated in FIG. 2, but that the lines of intersection are actually well outside the sensitive area of those optical planes. Similarly, the points of mutual intersection of three planes corresponding to point A, FIG. 2, and which forms the reference locus for determination of the $x$ and $y$ coordinates of the bullet's path through the target plane, is located outside the sensitive area of the planes. It will be understood by those skilled in the art that the invention is not limited to the particular geometric configurations illustrated, or by the illustrated arrangement of the chronograph counters. For example, in some applications of this invention, it will be preferable to arrange the chronograph start and stop signals so that (referring to the configuration of FIG. 2) the chronographs are started in turn as the bullet successively passes points $m$, $n$, and $o$, with all being stopped simultaneously as the bullet reaches point $p$. This was done to facilitate the use of massive frame members, but does not detract in any way from the accuracy of the solution for bullet position, although it does require the introduction of corrective constants into the computer solution.

Although in the preferred embodiment it was convenient to employ incandescent light bulbs as the source of the light beams, it is apparent that other electromagnetic radiation sources are completely applicable. For example, solid state laser sources will be advantageous in some applications of the invention, while ultraviolet or infrared sources may be preferable in others. In applications requiring a large scale configuration, microwave beams have particular advantages.

What is claimed is:

1. A method of measuring a coordinate locating the path of a ballistic projectile in flight with reference to a fixed locus in space defined by the intersection of a linearly extended dimension of a first collimated beam of radiation with the linearly extended dimension of a second collimated beam of radiation, which comprises ascertaining as a first factor the time interval required for passage of said ballistic projectile from said first of said collimated beams to said second of said collimated beams, ascertaining as a second factor the time interval required for passage of said ballistic projectile between one of a pair consisting of said first collimated beam and said second collimated beam and a third collimated beam of radiation intersecting the line of flight of said ballistic projectile, and determining said coordinate as a function of said first and second factors.

2. A method of measuring a first and a second coordinate locating the path of a ballistic projectile in flight with reference to a fixed locus in space defined by the intersection of a linearly extended dimension of a first collimated beam of radiation with a linearly extended dimension of a second and a linearly extended dimension of a third collimated beam of radiation, which comprises ascertaining as a first factor the time interval required for passage of the projectile from said first collimated beam to said second collimated beam, ascertaining as a second factor the time required for passage of said ballistic projectile from said first collimated beam to said third collimated beam, ascertaining as a third factor the time required for passage of said ballistic projectile between one of a group consisting of said first, second and third collimated beams and a fourth collimated beam of radiation intersecting the line of flight of said ballistic projectile, determining said first coordinate as a function of said first and third factors, and determining said second coordinate as a function of said second and third factors.

3. A method of measuring a coordinate of the intersection of the path of a projectile with a target plane substantially normal to said path, which comprises ascertaining the time required for passage of the projectile from said target plane to a second plane parallel to the target plane and spaced therefrom in the direction of motion of the projectile; ascertaining the time required for passage of the projectile from the target plane to an oblique plane intersecting said target plane and said second plane and disposed to intersect said projectile path between said target and said second plane and determining said coordinate as a function of the fraction defined by dividing the time required for passage of the projectile from said target plane to said oblique plane by the time required for passage of the projectile from said target plane to said second plane.

4. A method of measuring the horizontal and vertical coordinates of the intersection of a substantially horizontal path of a projectile with a substantially vertical target plane, which comprises ascertaining as a first factor the time required for passage of the projectile between two substantially parallel planes, one of which is the target plane, substantially normal to the projectile path and spaced from each other along the projectile path; ascertaining as a second factor the time required for passage of said projectile between one of said substantially parallel planes and a first oblique plane intersecting the projectile path and intersecting both said parallel planes in substantially horizontal lines; ascertaining as a third factor the time required for passage of said projectile between one of said parallel planes and a second oblique plane intersecting the projectile path and intersecting said parallel planes in substantially vertical lines, and determining said vertical coordinate as a function of the fraction defined by dividing said second factor by said first factor and determining said horizontal coordinate as a function of the fraction defined by dividing said third factor by said first factor.

5. A method of measuring the horizontal and vertical coordinates of the intersection of a substantially horizontal path of a projectile with a substantially vertical target plane, which comprises ascertaining as a first factor the time required for passage of the projectile between two substantially parallel planes, one of which is the target plane, substantially normal to the projectile path and spaced from each other along the projectile path; ascertaining as a second factor the time required for passage of the projectile between one of said substantially parallel planes and a first oblique plane intersecting the projectile path between said parallel planes and intersecting both said parallel planes in substantially horizontal lines; ascertaining as a third factor the time required for passage of the projectile between one of said parallel planes and a second oblique plane intersecting the projectile path between said parallel planes and intersecting said parallel planes in substantially vertical lines, and determining said vertical coordinate as a function of the fraction defined by dividing said second factor by said first factor and determining said horizontal coordinate as a function of the fraction defined by dividing said third factor by said first factor.

6. A method of measuring a radial coordinate of the intersection of a substantially horizontal path of a projectile with a substantially vertical target plane with reference to a center of coordinates, which comprises ascertaining as a first factor the time required for passage of a projectile between two substantially parallel planes, one of which is the target plane, substantially normal to the projectile path and spaced from each other along the projectile path; ascertaining as a second factor the time required for passage of said projectile between one of said parallel planes and a conical surface disposed with its axis parallel to said projectile path and with its surface intersecting one of said parallel planes in a circle, and determining the radial distance of said projectile path from the center of said circle as a function of the fraction defined by dividing said second factor by said first factor.

7. A method of measuring the horizontal and vertical coordinates of the path of a projectile as defined in claim 5 and simultaneously determining the velocity of the projectile at the target plane as a function of the fraction defined by dividing the distance between the two vertical planes by the time required for the projectile to pass from one vertical plane to the other vertical plane.

8. A method of measuring the center of impact of a plurality of projectiles in a target plane, comprising measuring the horizontal and vertical coordinates of a plurality of projectiles by the method defined in claim 5 and summing all of the horizontal coordinates and dividing the sum by the number of projectiles and summing all of the vertical coordinates and dividing that sum by the number of projectiles.

9. A method of determining the location of each of a plurality of shots with respect to the center of impact as the origin, comprising determining the center of impact by the method defined in claim 8 and subtracting the coordinates of the center of impact from the coordinates of each individual projectile path.

10. A method of determining the distance of each of a plurality of shots from the center of impact of the plurality of shots, comprising determining the coordinates of each of a plurality of shots with relation to the center of impact as the origin by the method defined in claim 9 and determining the square root of the sum of the squares of the coordinates of each shot referred to the center of impact as the origin.

11. A method of determining the mean radius of a plurality of shots with respect to the center of impact of those shots, comprising determining the distance of each shot from the center of impact by the method defined in claim 10 and dividing the sum of such distances by the number of shots.

12. Apparatus for measuring the velocity of a projectile and the horizontal and vertical coordinates of the intersection of the path of the projectile with a terminal plane, comprising four planar optical screens, a first and a second one of said optical screens being substantially vertical and normal to a substantially horizontal path of a projectile and spaced from each other along the path of the projectile with one of said first and said second screens being located in said terminal plane, a third one of said optical screens extending obliquely from a vertical edge of said first optical screen to a vertical edge of said second optical screen intersecting the path of the projectile between said first and said second optical screens, and the fourth one of said optical screens extending obliquely from a horizontal edge of said first optical screen to a horizontal edge of said second optical screen intersecting the path of the projectile between said first and said second optical screens, optical detecting means individually associated with each one of said optical screens responsive to a momentary partial interruption of said optical screen by the passage of a projectile therethrough, and three time interval measuring devices initiated in operation by the detecting means associated with said first optical screen, each one of said time interval measuring devices being terminated by the detecting means associated with an individual one of said second, third and fourth optical screens to measure separately the time required for a projectile to pass from said first optical screen to each one of said second, third and fourth optical screens, whereby the velocity and horizontal and vertical coordinates of the intersection of the path of a projectile with the terminal plane can be computed from the physical dimensions of the optical screen system and the three time intervals determined by the time interval measuring devices.

13. Apparatus as defined in claim 12, the optical detecting means associated with each optical screen comprising means to project a sheet of parallel collimated light rays from one end of each optical screen to the other end of the same screen, and photosensitive detector means in optical alignment with the sheet of collimated light rays responsive to any interruption of the light rays to generate an electrical signal.

14. Apparatus as defined in claim 13, said photosensitive detector means comprising a receiver slit to receive the sheet of collimated light, means to divide said sheet of light into a plurality of discrete bands, and lens means focusing each of said bands of collimated light on a separate photosensitive detector.

No references cited.

RALPH G. NILSON, Primary Examiner

MARTIN ABRAMSON, Assistant Examiner

U.S. Cl. X.R.

250—220; 273—102.2

UNITED STATES PATENT OFFICE
CERTIFICATE OF CORRECTION

Patent No. 3,487,226 (D-1488)    Dated December 30, 1969

Inventor(s) Harry G. Conner and Edward W. Yetter

It is certified that error appears in the above-identified patent and that said Letters Patent are hereby corrected as shown below:

Col. 2, Line 53, the first word, "arrangement" has been misspelled; Col. 4, Line 14, the first word, "light", should read as "--length--"; Col. 5, Line 28, "between the" should be omitted; Col. 6, Line 65, "predetermined" has been misspelled; Col. 8, Line 16, that portion of the formula reading $$\frac{90°}{TV_V}$$ should read as $$\frac{90°}{v\,t_V}\,;$$

Col. 8, Line 44, the "s" should be omitted from "...Note #s 1...".

SIGNED AND SEALED

JUL 14 1970

(SEAL)
Attest:

Edward M. Fletcher, Jr.
Attesting Officer

WILLIAM E. SCHUYLER, JR.
Commissioner of Patents